United States Patent
Guthrie et al.

(10) Patent No.: US 10,434,343 B1
(45) Date of Patent: Oct. 8, 2019

(54) QUICK-RELEASE ATTACHMENT POINT FOR FALL PROTECTION

(75) Inventors: Karl Guthrie, Austin, TX (US); Joseph Schwartz, Wimberley, TX (US)

(73) Assignee: Climb Tech, LLC, Austin, TX (US)

( * ) Notice: Subject to any disclaimer, the term of this patent is extended or adjusted under 35 U.S.C. 154(b) by 817 days.

(21) Appl. No.: 13/065,098

(22) Filed: Mar. 14, 2011

(51) Int. Cl.
*A62B 35/04* (2006.01)
*A01K 27/00* (2006.01)
*B66C 1/36* (2006.01)

(52) U.S. Cl.
CPC ............ *A62B 35/04* (2013.01); *A01K 27/004* (2013.01); *B66C 1/36* (2013.01)

(58) Field of Classification Search
CPC .......... A01K 27/004; B66C 1/36; A62B 35/04
USPC ............................................... 182/3; 119/796
See application file for complete search history.

(56) References Cited

U.S. PATENT DOCUMENTS

| | | | | |
|---|---|---|---|---|
| 1,411,549 A | * | 4/1922 | Abbott | B66C 1/36 294/82.21 |
| 1,524,761 A | * | 2/1925 | Timbs | E21B 19/04 294/82.19 |
| 1,545,377 A | * | 7/1925 | Westmoreland | B66C 1/36 294/82.2 |
| 3,493,260 A | * | 2/1970 | Smith | B66C 1/36 294/82.33 |
| 4,372,016 A | * | 2/1983 | LaViolette | B66C 1/36 24/598.4 |
| 4,423,796 A | * | 1/1984 | Sulowski | E04G 21/3261 182/8 |
| 4,539,732 A | * | 9/1985 | Wolner | B66C 1/36 24/600.2 |
| 5,727,834 A | * | 3/1998 | Weselowski | B66C 1/36 294/82.19 |
| 5,735,025 A | * | 4/1998 | Bailey | F16B 45/02 24/600.1 |
| 5,820,181 A | * | 10/1998 | Le Noach | B63B 21/54 294/82.19 |

(Continued)

FOREIGN PATENT DOCUMENTS

| | | | |
|---|---|---|---|
| CA | 1125647 A1 | * | 6/1982 |
| CA | 1125647 A1 | * | 6/1982 |

(Continued)

OTHER PUBLICATIONS http://translationportal.epo.org/emtp/translate/?ACTION=abstract-retrieval&COUNTRY=FR&ENGINE=google&FORMAT=docdb&KIND=A1&LOCALE=en_EP&NUMBER=2967076&SRCLANG=FR&OPS=ops.epo.org/3.2&TRGLANG=en.*
http://translationportal.epo.org/emtp/translate/?ACTION=description-retrieval&COUNTRY=FR&ENGINE=google&FORMAT=docdb&KIND=A1&LOCALE=en_EP&NUMBER=2967076&OPS=ops.epo.org/3.2&SRCLANG=fr&TRGLANG=en (Year: 2018).*

*Primary Examiner* — Katherine W Mitchell
*Assistant Examiner* — Candace L Bradford
(74) *Attorney, Agent, or Firm* — Birdwell & Janke, LLP (57) ABSTRACT

A quick-release attachment point for fall protection. It includes a body portion, a retaining member, a capturing and releasing mechanism, a remote control module, and an energy source. The body portion, and the retaining member in a normal position thereof, together form a closed aperture for capturing a D-ring attachment point or other article of attachment hardware. The capturing and release mechanism is operated through the remote control module to free the retaining member so that it can move, in response to energy provided by the energy source, in a direction away from the normal operating position and in an amount such that it no longer closes the aperture, so that the article can escape from the apparatus.

25 Claims, 8 Drawing Sheets

(56) References Cited

U.S. PATENT DOCUMENTS

| | | | | |
|---|---|---|---|---|
| 6,109,578 A * | 8/2000 | Guthrie | A63B 29/024 | 248/231.9 |
| 6,832,417 B1 * | 12/2004 | Choate | B66C 1/36 | 24/599.5 |
| 7,150,247 B2 * | 12/2006 | Eulette | A01K 27/004 | 119/798 |
| 7,472,461 B2 * | 1/2009 | Anstee | A63B 29/02 | 24/600.8 |
| 8,230,822 B2 * | 7/2012 | Smith | | 119/794 |
| 8,240,727 B2 * | 8/2012 | Toon | B66C 1/36 | 294/82.21 |
| 8,276,712 B2 * | 10/2012 | Smith | A62B 35/0037 | 119/796 |
| 8,365,365 B2 * | 2/2013 | Schlipper | F16B 45/04 | 24/265 H |
| 8,424,638 B1 * | 4/2013 | Guthrie | E04G 21/3276 | 182/3 |
| 8,469,149 B2 * | 6/2013 | Meillet | A62B 35/0093 | 182/230 |
| 8,534,626 B1 * | 9/2013 | Freese | A47G 29/083 | 24/376 |
| 9,174,072 B2 * | 11/2015 | Strasser | A62B 35/0087 | |
| 2002/0162201 A1 * | 11/2002 | Liu | F16B 45/025 | 24/598.5 |
| 2004/0213633 A1 * | 10/2004 | Guthrie | A63B 29/024 | 403/367 |
| 2007/0294867 A1 * | 12/2007 | Lin | F16B 45/04 | 24/600.4 |
| 2008/0223308 A1 * | 9/2008 | Stern | A01K 27/004 | 119/720 |
| 2010/0282541 A1 * | 11/2010 | Renton | A62B 1/18 | 182/234 |
| 2010/0314196 A1 * | 12/2010 | De Boeck | A62B 35/0087 | 182/3 |
| 2011/0036304 A1 * | 2/2011 | Smith | A01K 27/004 | 119/796 |
| 2011/0085873 A1 * | 4/2011 | Guthrie | A63B 29/024 | 411/55 |
| 2011/0315090 A1 * | 12/2011 | Marshall | A01K 27/004 | 119/796 |
| 2013/0008392 A1 * | 1/2013 | Holmstrom | A01K 27/004 | 119/796 |
| 2013/0025968 A1 * | 1/2013 | Smith | A62B 35/0037 | 182/3 |
| 2013/0062144 A1 * | 3/2013 | Fleming | B60R 22/02 | 182/3 |
| 2013/0081580 A1 * | 4/2013 | Bogdahn | A01K 27/004 | 119/796 |
| 2013/0213735 A1 * | 8/2013 | Dehondt et al. | | 182/3 |

FOREIGN PATENT DOCUMENTS

| | | | | |
|---|---|---|---|---|
| FR | 2967076 A1 * | 5/2012 | | A62B 35/0087 |
| FR | 2967076 A1 * | 5/2012 | | A62B 35/0087 |
| WO | WO 9917839 A1 * | 4/1999 | | A62B 1/04 |
| WO | WO-9917839 A1 * | 4/1999 | | A62B 1/04 |

* cited by examiner

PRIOR ART

Fig. 5

PRIOR ART

QUICK-RELEASE ATTACHMENT POINT FOR FALL PROTECTION

FIELD OF THE INVENTION

The present invention relates to an attachment point, which is hardware that is used in providing for fall protection.

BACKGROUND

In construction, there is a need to tether construction workers to the structure being constructed, so that if the worker falls, the fall is shortened so that the worker is not injured or killed. Typically, the worker wears a harness, and the harness is removably connected or attached to a lanyard. A lanyard is a flexible tensile member such as a rope, cable, or web that has attachment hardware, typically a carabiner, at each end. Typically, at one end of the lanyard, the lanyard is coupled to an "anchor point" on the structure, and at the other end of the lanyard, the lanyard is coupled to the harness.

Figure 1:
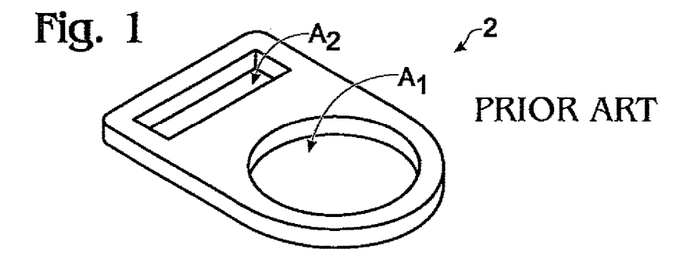
FIG. 1 is an isometric view of a typical prior art D-ring attachment point.
Figures 2, 3:
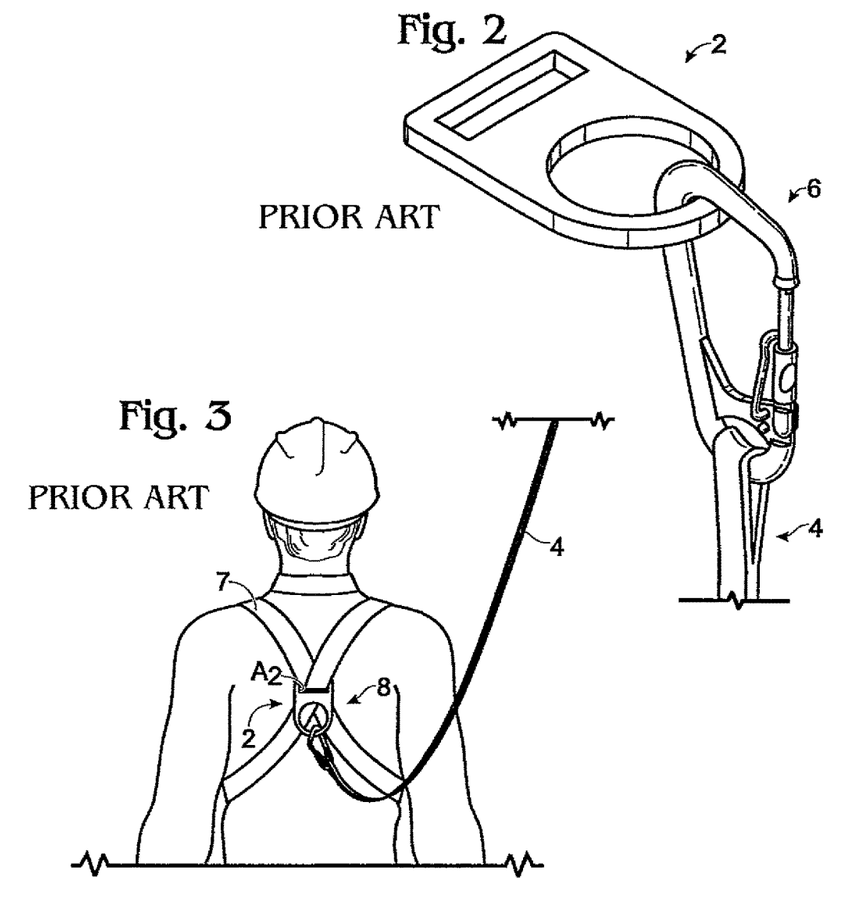
FIG. 2 is an isometric view of a lanyard connected to the D-ring attachment point of FIG. 1 via a carabiner.
FIG. 3 is a pictorial view of the D-ring attachment point of FIG. 1 used to connect to a harness.

The lanyard, specifically the carabiner at the end thereof, is coupled to the harness through another article of attachment hardware known as a "D-ring." A typical D-ring 2 is shown in FIG. 1, and FIG. 2 shows a lanyard 4 attached to the D-ring 2 via a carabiner 6.

Referring to FIG. 1, the D-ring 2 generally has two closed apertures $A_1$ and $A_2$. The larger aperture $A_1$ is for receiving the carabiner. The smaller aperture $A_2$ is for attaching to a structure. For example, FIG. 3 shows the D-ring 2 attached to a harness 8 formed of webbing 7. A loop of the webbing extends through the aperture $A_2$, to connect the D-ring to the harness.

Figure 4:
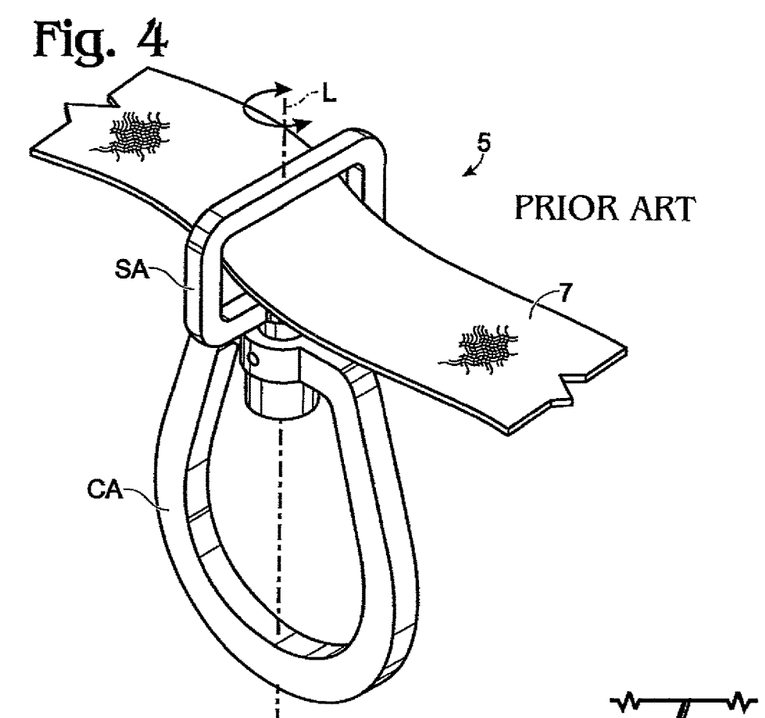
FIG. 4 is an isometric view of a preferred, swivel D-ring attachment point used to connect to webbing of the harness of FIG. 3.
Figure 5:
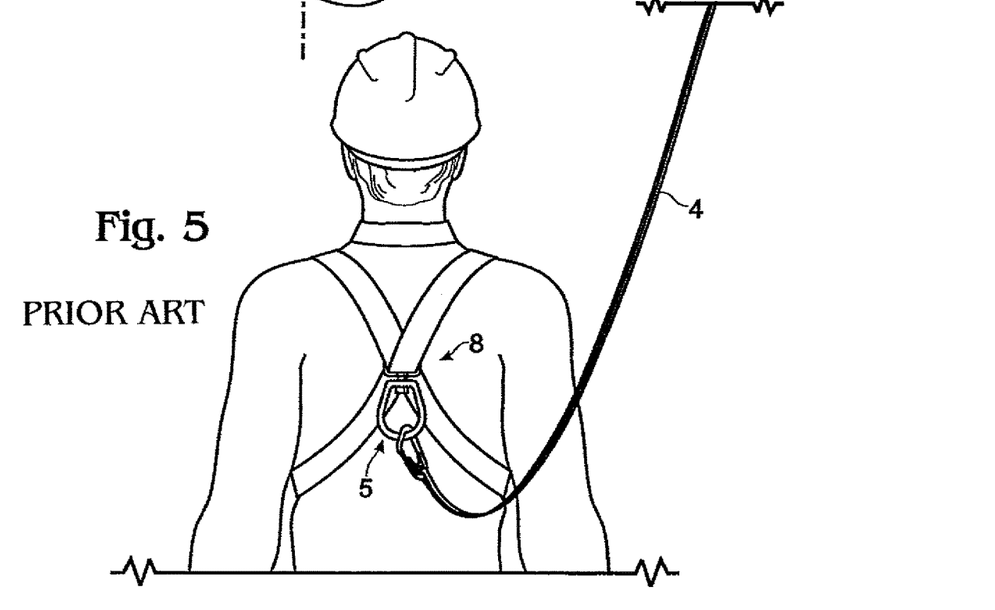
FIG. 5 is an elevation view of the D-ring attachment point of FIG. 4 used to connect to the harness thereof.

The D-ring 2 is an example of what may generally be referred to in the art, and what is specifically referred to herein, as a "D-ring attachment point." Another example of a D-ring attachment point is the swivel D-ring attachment point described in the inventors' patent application Ser. No. 12/807,290, Pub. No. US 2010/0326767, which is incorporated by reference herein in its entirety. FIGS. 4 and 5 show this attachment point (referenced as 5) attached to the webbing 7 of the harness 8 (not shown). The attachment point 5 has two ring-like portions that are permitted to swivel relative to one another about a longitudinal axis "L." The larger of these ring-like portions is referred to as a "caribiner-attachment" ("CA") portion and is adapted for receiving the caribiner, and the other is referred to as a "structure-attachment" ("SA") portion and is adapted for attaching, e.g., to the webbing 7 as shown.

The present invention provides for yet another article of attachment hardware, for attaching D-ring attachment points to the webbing 7 of a harness 8.

SUMMARY

A quick-release attachment point for fall protection is disclosed herein. The quick-release attachment point includes a body portion, a retaining member, a capturing and releasing mechanism, a remote control module, and a source of energy.

The body portion defines an aperture extending therethrough, the aperture being "open" as defined herein. The body portion supports the retaining member, the capturing and releasing mechanism, and an energy source.

The capturing and releasing mechanism is capable of adopting at least two different configurations. In a first configuration, the capturing and releasing mechanism maintains the retaining member in a normal position relative to said body portion. The retaining member has an end that is disposed, in the normal position of the retaining portion, relative to the aperture so as to "close" the aperture as defined herein.

The capturing and releasing mechanism is adapted to respond to user manipulation of the remote control module, to change from its first configuration into a second configuration in which the capturing and releasing mechanism is no longer capable of maintaining the retaining member in the normal operating position.

The body portion and the capturing and releasing mechanism are cooperatively adapted to permit the retaining member, in the second configuration of the capturing and releasing mechanism, to move in a direction away from the normal operating position and in an amount such that the end no longer closes the aperture.

The energy source is provided to motivate the retaining member to move as described above once the capturing and releasing mechanism has freed it to do so.

Preferably, the energy source is one or more springs that spring-bias the retaining member relative to the body portion.

Preferably, the remote control module includes an elongate member connected to the capturing and releasing mechanism, and the capturing and releasing mechanism is adapted, in response to a force applied to the elongate flexible member, to change from the first configuration into the second configuration.

More preferably, the elongate member comprises at least two separate portions, a first of which is permitted to move at least a predetermined amount relative to the other, such as by providing the first to be spring-biased relative to the second such that this spring-bias must be overcome, before sufficient force can be transmitted from the first portion of the elongate flexible member to the second portion of the elongate member to produce the aforedescribed change in configuration of the capturing and releasing mechanism.

Still more preferably, the remote control module includes a sleeve that houses the elongate member. The sleeve is connected, at one end thereof, to the body portion and, at the other end thereof, to an actuating mechanism. The actuating mechanism is adapted to require, before allowing for the transmission by the elongate member a sufficient force to produce the aforedescribed change in configuration of the capturing and releasing mechanism, applying to the actuating device an opposing force.

The quick-release attachment point described above is preferably provided in combination with a separate article of attachment hardware attached thereto. The article has a portion thereof that is captured within the aperture when the aperture is closed such that the article is retained by the apparatus.

The aperture, when open, is open to a predetermined degree that is sufficient to allow for the escape of the article from the apparatus.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

The invention addresses a specific problem in the art of providing fall protection in the construction industry recognized by the present inventors. As explained above, fall protection has heretofore been provided for protecting a worker from injuries that would otherwise be sustained as a result of the worker falling. But when structures are constructed of large pre-fabricated parts, such as pre-cast concrete structures, there is a significant risk that one of these large components, either during the time it is being moved into place or after it has been moved into place but before it is fully attached to or integrated with the existing structure, will itself fall. Construction workers under such conditions who have tethered themselves to the structure as a precaution against falling from the structure may be unable to move far enough away from a falling component to avoid being hit and seriously injured or killed.

Figure 6:
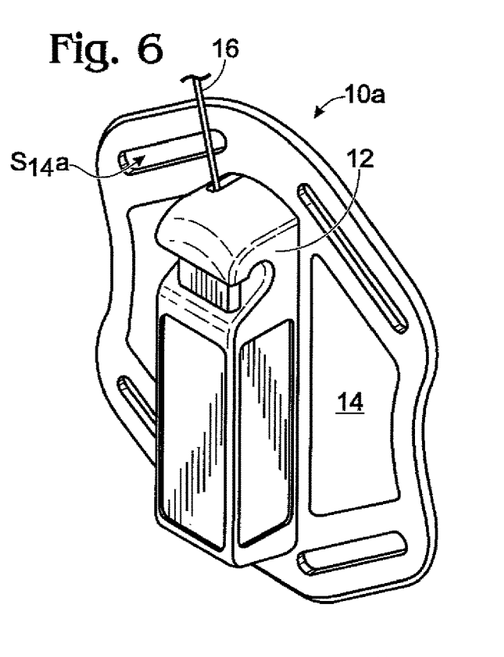
FIG. 6 is an isometric view of a quick-release attachment point according to the present invention.

FIG. 6 shows a capture-and-release module ("CAR module") 10a of a quick-release attachment point according to the invention that solves this problem. The CAR module 10a includes a main body portion 12 supporting a capture-and-release mechanism ("CAR mechanism") 13 for releasably capturing a ring-like portion of an attachment point, such as the portion SA of the attachment point 5 (FIGS. 4 and 5), and a harness-attachment portion 14 that is either an integral part of or is connected to the main body portion 12 for attaching the main body portion to the aforedescribed webbing 7 of the harness 8.

Not shown in FIG. 6 but described further below is a remote-control module 10b adapted for controlling the CAR module remotely therefrom. The two modules 10a and 10b are shown together in FIG. 18, and together they compose the attachment point, which is referenced in FIG. 17 and referred to hereinbelow as attachment point 10.

The remote-control module 10b is coupled to the CAR module via a master linking member 16.

The main body portion 12 preferably contains the CAR mechanism within an enclosed volume that renders the CAR mechanism not readily accessible to the user. However, the harness-attachment portion 14 preferably forms at least a portion of one or more of the sides of the enclosed volume defined by the body portion 12, in which case access to the CAR mechanism can be obtained by removing the harness-attachment portion, e.g., by removing one or more screws used to attach the harness-attachment portion to the main body portion.

Figure 7:
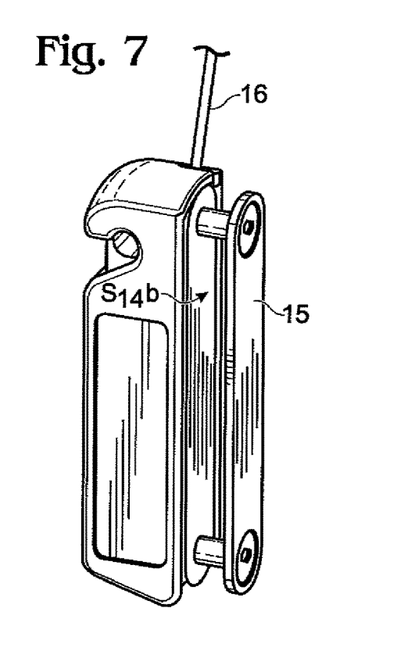
FIG. 7 is an isometric view of an alternative quick-release attachment point, illustrating an alternative harness-attachment portion.
Figure 10:
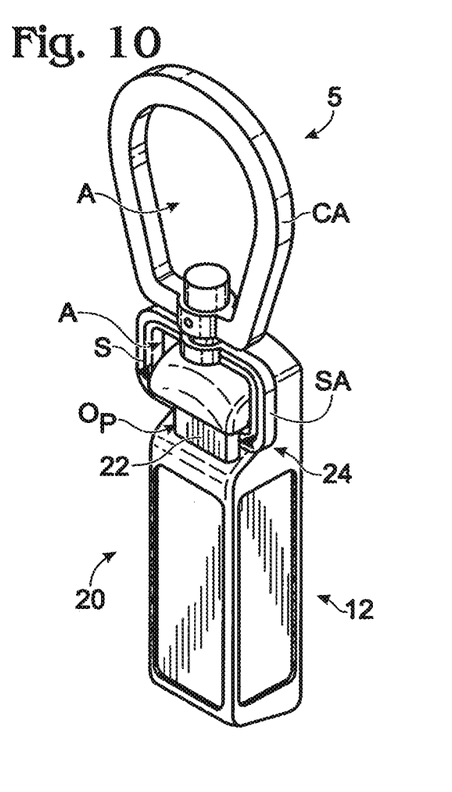
FIG. 10 is an isometric view of the quick-release attachment point of FIG. 6, with a D-ring swivel attachment point attached thereto.

FIG. 6 shows a harness-attachment portion 14 having four slots $S_{14}a$, each being adapted to receive, so as to extend therethrough, a length of webbing 7. An alternative CAR module with a harness-attachment portion 15 that defines only one slot S is shown in FIG. 7. As will be readily appreciated, many other alternatives are possible, and the harness-attachment portion 15 is shown in FIG. 10 generically, without any slots.

Figure 8:
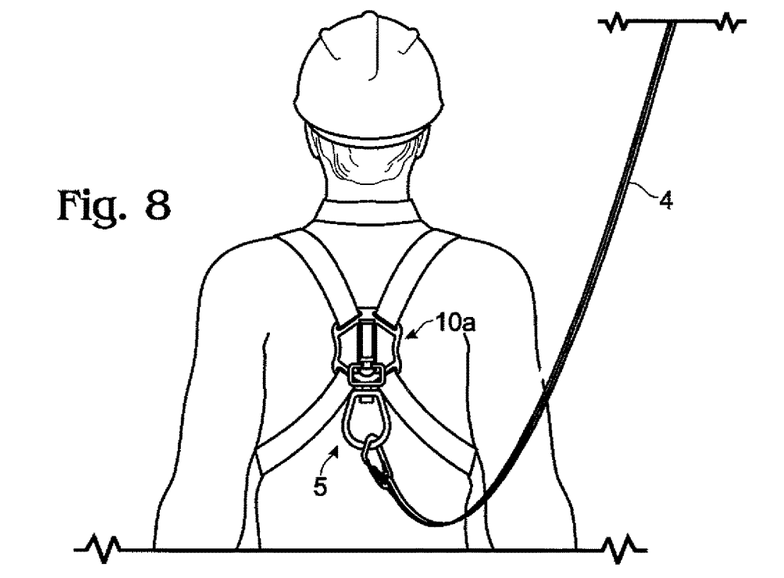
FIG. 8 is an elevation view of the D-ring attachment point of FIGS. 6 and 7 used to connect to the harness of FIG. 5.

FIG. 8 shows the CAR module 10a of FIG. 6 attached to a harness, corresponding to FIG. 3.

Figure 9:
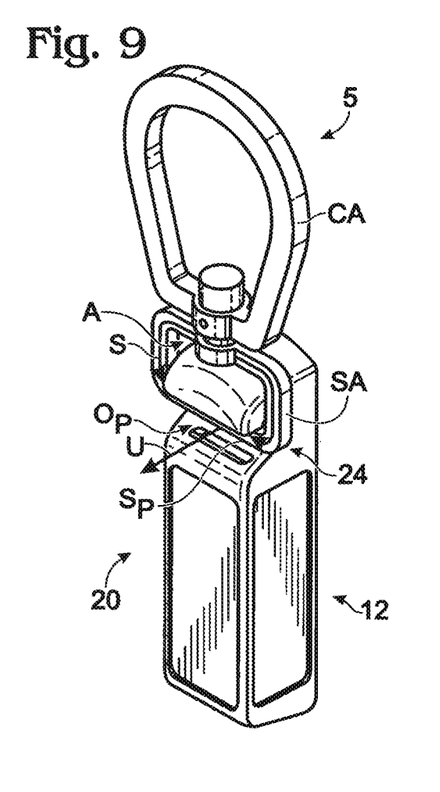
FIG. 9 is an isometric view of the main body portion of the quick-release attachment point of FIG. 6, with the D-ring attachment point of FIG. 4 connected thereto.

FIG. 9 shows just the main body portion 12 with the attachment point 5 connected. The main body portion has an aperture 24 at an end 20 thereof for receiving the ring-like structure attachment ("SA") portion of the attachment point 5. Use of the attachment point 5 is preferred, and the invention will be described below in this particular context, but it will be understood that other attachment points or attachment hardware could be used in place of the attachment point 5 and that the same principles will apply.

The term "open" is used herein to refer to the condition of the aperture 24 shown in FIG. 9, i.e., the aperture 24 is "open." Defining this term, as well as the alternative term "closed," requires some discussion.

As mentioned, the SA portion of the attachment point 5 is in general "ring-like," meaning that it has structure "S" that fully surrounds an aperture "A" defined through the structure. The aperture 24 of the main body portion 12 does not receive the entire SA portion therethrough. Rather, the aperture 24 "receives" the SA portion as a result of that sub-portion of the structure "S" referenced in FIG. 9 as "$S_P$" being passed through an opening "$O_P$" into the aperture 24. The aperture 24 is "open" due to the presence of the opening $O_P$. Since the aperture 24 is itself an opening (through the main body portion 12), the opening $O_P$ is properly understood to be an opening into an opening.

By comparison with FIG. 9, FIG. 10 shows the main body portion 12 together with the CAR mechanism 13 and the D-ring attachment point 5 attached. The aperture 24 in FIG. 10 is "closed" by a terminal portion 22 of the CAR mechanism 13. This is because there is no opening $O_P$ into the aperture 24, out through which any portion of the structure S of the ring-like SA portion can pass; thus, the D-ring attachment point 5 is linked to the main body portion 12 through the aperture 24 and cannot be pulled free from it.

The opening $O_P$ in the open configuration of the aperture 24 is of sufficient size to allow the aperture 24 to receive the SA portion of the attachment point 5 as defined above. Preferably, there is substantially no opening when the aperture is closed as shown in FIG. 10; however, the aperture may be "closed" sufficiently for purposes herein so long as any opening less than $O_P$ is not large enough to allow the D-ring attachment point 5, or other article of attachment hardware, to escape from the attachment point 10.

Figures 11, 12:
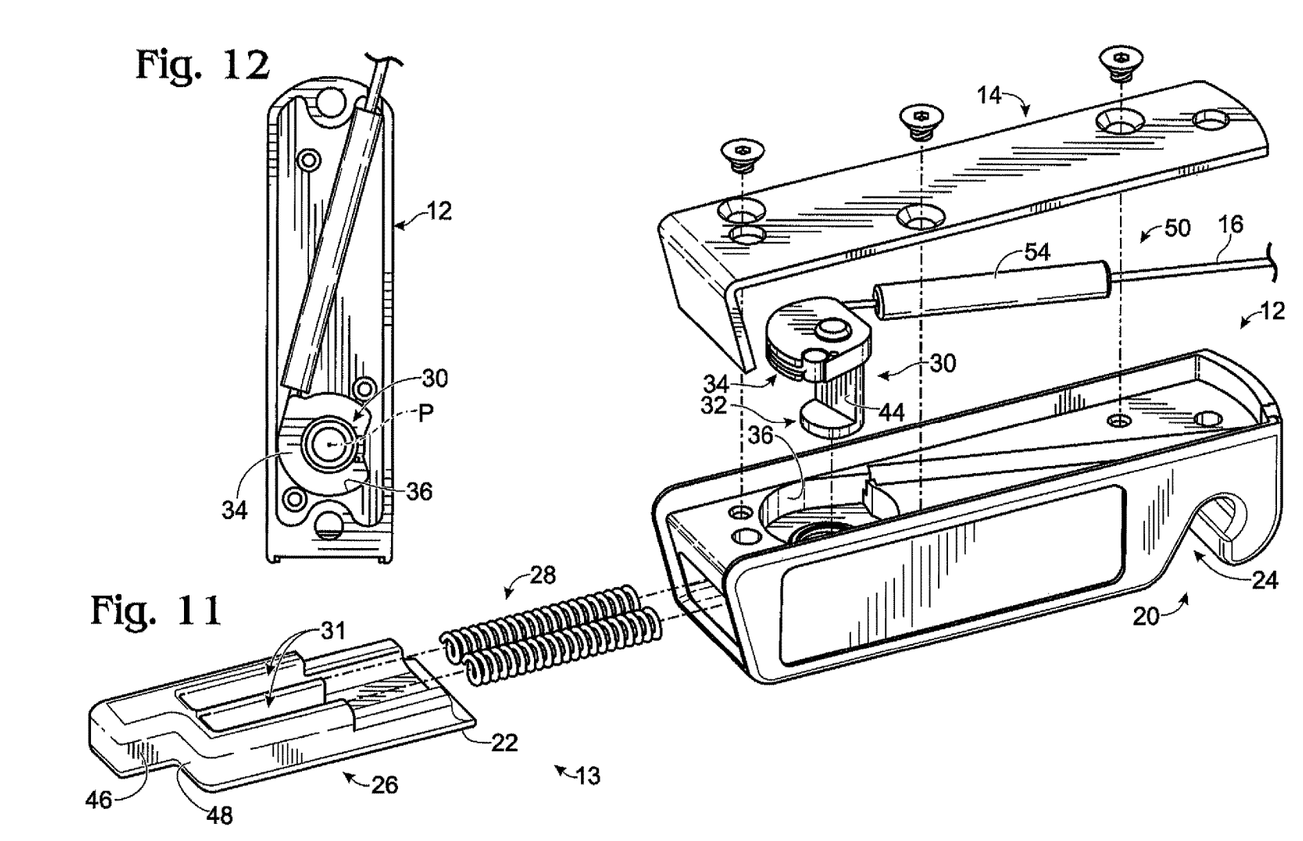
FIG. 11 is an isometric exploded view of the quick-release attachment point of FIG. 6.
FIG. 12 is a plan view of the interior of a main body portion of the quick-release attachment point of FIG. 6, and also showing a cam member of a capture and release mechanism according to the present invention.

FIG. 11 shows the CAR mechanism 13 exploded from the main body portion 12. The terminal portion 22 of the CAR mechanism is part of a sliding retainer 26 that is spring-biased to slide away from the end 20 of the main body portion 12. The sliding retainer is only allowed to move in response to this spring-bias as a result of user action described later below. When this action occurs, the terminal portion 22 of the CAR mechanism is thereby drawn away from the end 20 of the main body portion 12, so that the formerly closed aperture 24 is returned to an open configuration; preferably, to the same degree that it would be open if the sliding retainer 26 were not present. Thus, the configuration of FIG. 9 is achieved whereby the ring-like portion SA of the attachment point 5 may now escape the aperture 24, thereby releasing the attachment point 5 from the main body portion 12.

Preferably, for the sake of simplicity and economy of manufacture, a pair of compression springs 28 are utilized to provide this spring-biasing function, but any structure or device capable of forceably sliding the sliding retainer away from the end 20 of the main body portion could be used. The springs 28 are retained by the sliding retainer in conforming wells 31 formed therein, and act against a ledge (not shown) in the main body portion 12.

FIG. 11 also shows a cam 30 of the CAR mechanism 13 exploded from the main body portion 12. In the normal operating configuration of the attachment point 10, the sliding retainer 26 is locked in position so as to define and maintain the closed configuration of the aperture 24 by the cam 30.

FIG. 12 shows the cam 30 installed in the main body portion 12. Particularly, the cam 30 is rotatably mounted to the main body portion 12 so that the cam 30 may rotate about an axis which is seen end-on in FIG. 11 at the point "P," but is otherwise constrained within the main body portion.

In the preferred embodiment as shown in FIGS. 11 and 12, the cam 30 includes a relatively small diameter cylindrical or semi-cylindrical lower end 32 that is received in a lower and relatively small diameter cylindrical or semi-cylindrical bore (not visible) in the main body portion 12, and a larger diameter cylindrical or semi-cylindrical upper end 34 that is received in a relatively large diameter upper cylindrical or semi-cylindrical bore 36 in the main body portion 12, to provide an economical rotatable mounting arrangement. Many alternative rotatable mounting arrangements are possible.

Figures 13, 14, 18:
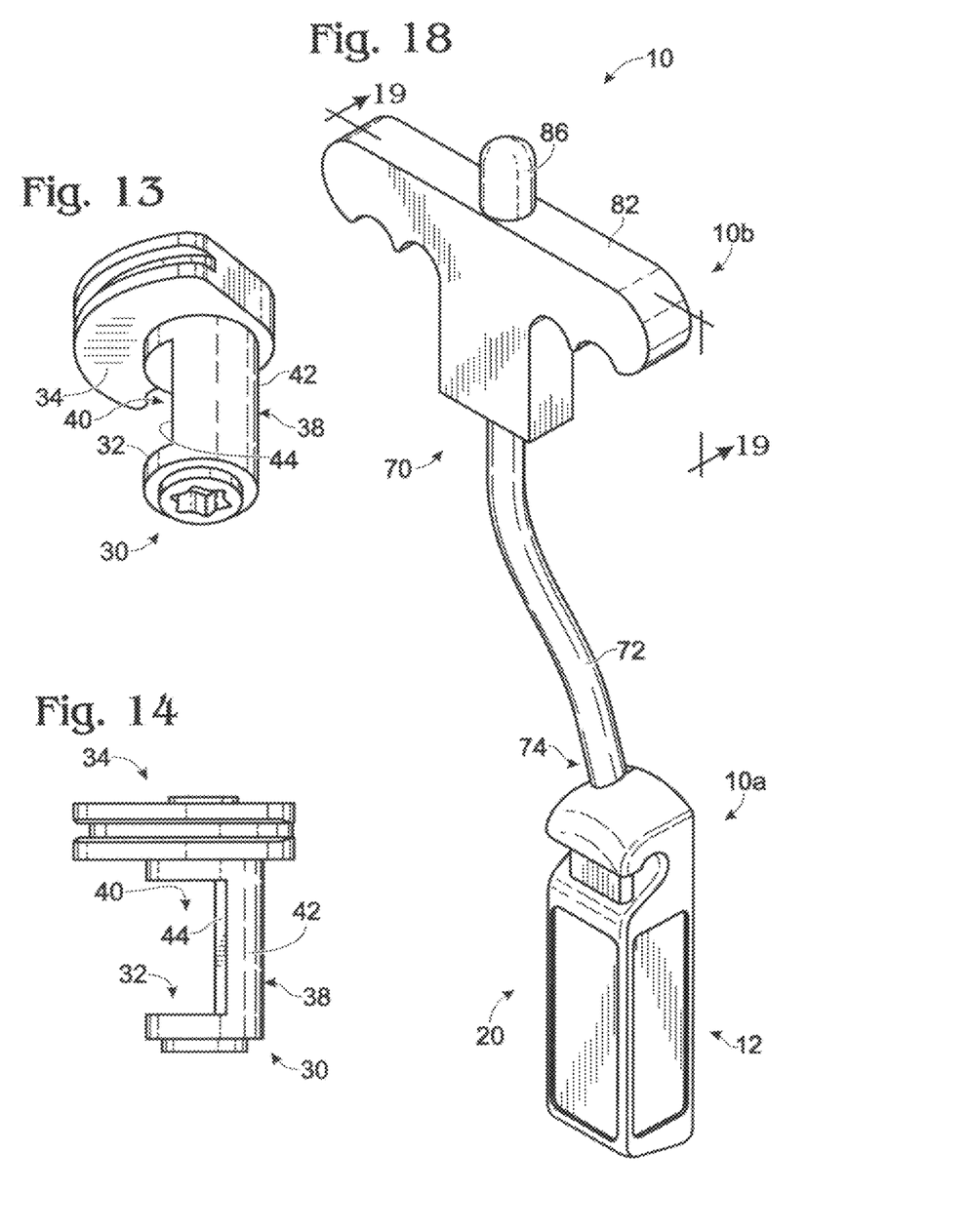
FIG. 13 is an isometric view of the cam member of FIG. 12.
FIG. 14 is a side elevation of the cam member of FIG. 12.
FIG. 18 shows the triggering portion of FIG. 15 in combination with an actuating portion of the remote control mechanism according to the present invention.

FIGS. 13 and 14 show the cam 30 in isolation. The cam 30 includes a stop member 38 that extends between the upper and lower ends 32 and 34. The stop member 38 can be seen as defining a cylindrical volume having the same diameter as that of the lower end 32 but with a substantial cut-out portion 40. The outer surface of the stop member therefore has a cylindrical surface 42 and a distinct clearance surface 44 that is preferably, though not necessarily, flat (best seen in FIG. 11).

In the normal operating configuration of the quick-release attachment point 10, the clearance surface 44 of the stop member 38 faces as shown in FIG. 11, and away from the sliding retainer 26; whereas the cylindrical surface 42 of the stop member 38 rests against a stop surface 46 of the sliding retainer 26, thereby maintaining the sliding retainer in the aforedescribed locked position.

If the cam 30 is turned 90 degrees clockwise as viewed in FIG. 11, the cylindrical surface 42 of the stop member 38 rides along the stop surface 46 of the sliding retainer 26, and the clearance surface 42 of the stop member 38 is turned to face and become substantially parallel to a side surface 48 of the sliding retainer 26. The clearance provided by the stop member once it is turned sufficiently allows the sliding retainer to pass by the cam in response to the propulsion provided by the spring-bias. This forcefully draws the terminal portion 22 of the CAR mechanism away from the end 20 of the main body portion 12 as noted above so as to transform the normally and formerly closed configuration of the aperture 24 into the open configuration.

Figures 15, 16:
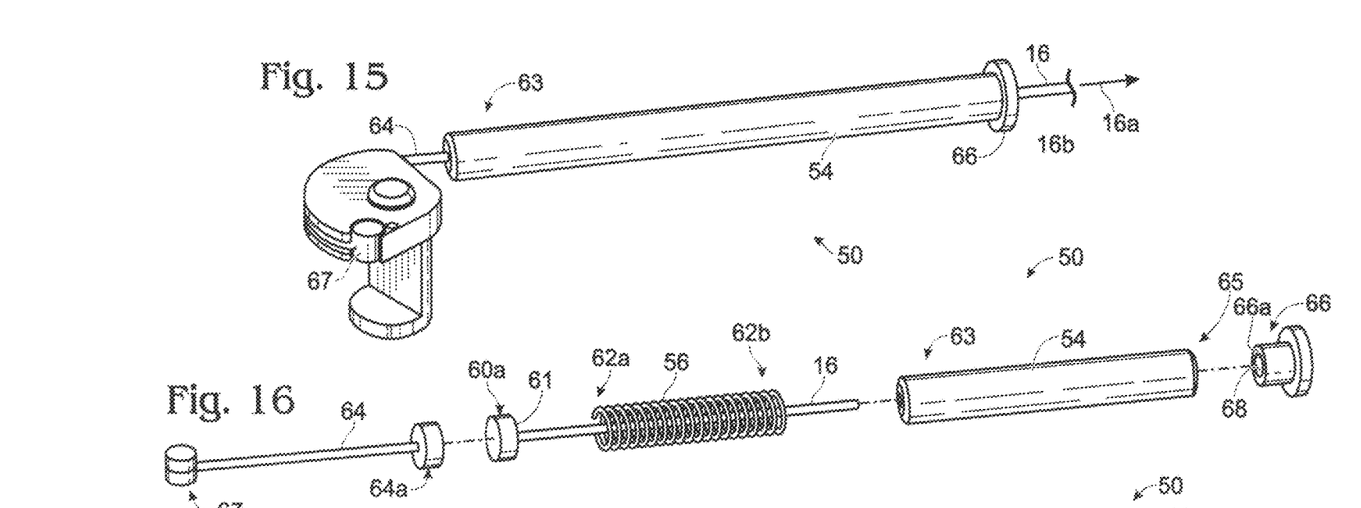
FIG. 15 is an isometric view of a triggering portion of a remote-control module according to the present invention, corresponding to FIG. 11.
FIG. 16 is an isometric exploded view of the triggering portion of FIG. 15.

The cam 30 is turned as just described by user manipulation of the aforementioned remote-control module 10b. FIG. 15 shows a triggering portion 50 of the remote-control module 10b in an assembled condition corresponding to FIG. 11, and FIG. 16 shows the triggering portion 50 exploded.

The triggering portion 50 could simply be an elongate member, which may be a flexible member such as a cable, rope or chain, or which may be a relatively stiff member such as a metal rod or dowel, attached to the cam 30 (shown as the linking member 16 in FIGS. 6 and 11). Described below will be a preferred adaptation of the invention in which a flexible member 16 is utilized to apply a tensile force to the module 10a; however, it will be understood that if a relatively stiff member is used, a compressive force could be utilized. In either case however, it is preferable to provide a safety feature to avoid accidental or premature triggering.

With reference to FIGS. 11, 15 and 16, a preferred structure for this purpose, assuming that the triggering portion 50 of the remote-control module actuates the cam 30 by use of a tensile force, includes a hollow cylindrical tube 54 that encloses a compression spring 56, both of which are coaxially provided around the master linking member 16.

With particular reference to FIGS. 15 and 16, the master linking member 16 has attached thereto a generally cylindrical foot member 60a attached, typically by swaging although numerous alternatives are possible, onto an end thereof, the foot member 60a being of sufficient size to both slidably fit within the cylinder 54 and provide a resting surface 61 for receiving a corresponding end 62a of the spring 56.

At an end 65 of the tube 54, opposite the end 63, a plug 66 is installed that provides an annular surface 66a that is a resting surface for receiving the other end 62b of the spring 56. The plug 66 has an aperture 68 for passing the master linking member 16 therethrough.

A second, slave linking member 64 has a foot member 64a at one end that is preferably identical in design and construction to the foot member 60a of the master linking member 16. The foot members 60a and 64a are positioned adjacent one another as shown in FIG. 15, within the tube 54 at an end 63 thereof. The end 63 of the tube 54 is reduced in diameter, such as by crimping, to retain the foot members therein against tensile forces applied by the user to the master and slave tensile members. That is, the hollow tube 54, via the foot members 60a and 64a, provides the tensile connection between the master and slave linking members.

At the opposite end of the slave linking member 64 a connecting member 67 is provided, typically by swaging although numerous alternatives are possible, to allow for attaching the slave tensile member to the cam 30 in a corresponding cavity thereof such as shown. With the slave tensile member 64 so attached to the cam 30 as shown in FIG. 11, tensile force applied to the slave linking member translates to a torque applied to the cam 30, for turning the cam 30 and thereby releasing the sliding retainer 26 as described above.

Figure 17:
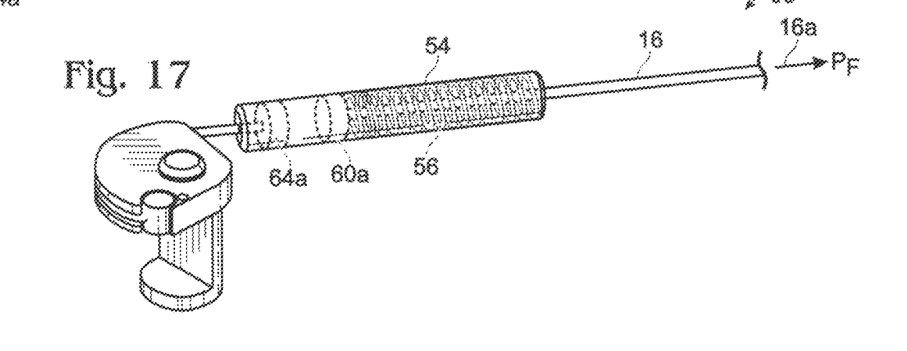
FIG. 17 is an isometric, partially cut-away view of the triggering portion of FIG. 15.

More particularly, with additional reference to FIG. 17, as the user applies a tensile or pulling force $P_F$ on the master linking member 16 in the direction indicated as 16a, the spring 56 is compressed by movement of the foot member 60a in the same direction. The foot member 60a of the master linking member slides within the tube 54 away from the foot member 64a of the slave linking member 64 so as to increasingly compress the spring. However, during this time, substantially no tensile force is being applied to the slave linking member. Eventually, upon reaching a trigger-ready condition of maximum separation of the two foot members within the tube as a result of the spring 56 becoming fully compressed, the tube 54 starts to move in the direction of the pull, pulling the foot member 64a with it. Upon reaching this trigger-ready condition, the triggering portion 50 is ready to transmit any additional pulling force applied by the user to the cam 30.

It will be appreciated that a similar structural adaptation of the triggering portion 50 to implement this safety feature could be used where the triggering portion 50 is to carry a compressive force. In such case, as an example, a foot member of the master linking member 16 could bear upon an unsupported end of an extension spring that is anchored within the tube 54, so that compressive force applied to the linking member 16 extends the extension spring within the tube 54 against a spring-bias. Once the extension reaches a predetermined amount, further extension brings the foot member to bear upon the slave linking member which, in turn, is adapted to transmit the additional compressive force to the cam 30. The cam 30 is suitably linked to the slave linking member so that it turns in response to a compressive force rather than a tensile force.

As another example, the slave linking member could be connected to the master linking member by another elongate flexible member that is slackened a predetermined amount, to allow the master linking member to distance itself from the slave linking member without encountering any substantial force until the slack is taken up.

It will be readily appreciated that many other alternative arrangements are possible.

Figure 19:
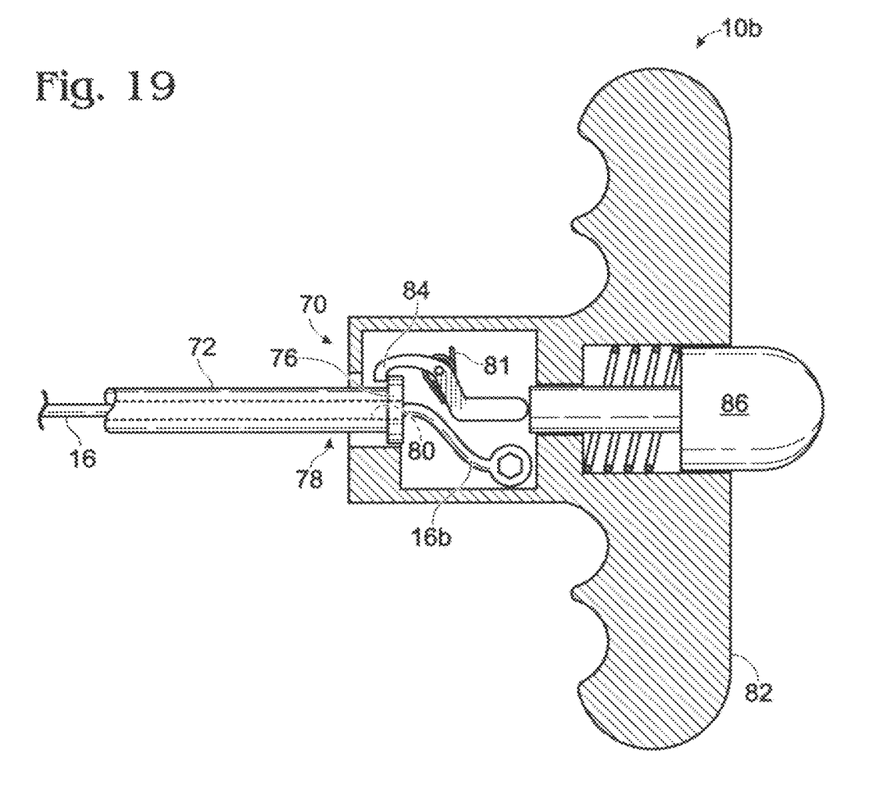
FIG. 19 is a sectional view of the actuating portion of FIG. 17, taken along a line 19-19 thereof.

The master linking member 16 could be manipulated directly by the user; however, it is preferable to provide an additional safety feature to avoid accidental or premature triggering. FIGS. 18 and 19 show a preferred actuating portion 70 of the remote-control module 10b, that connects to the master linking member 16 at an end 16b thereof, for this purpose.

FIG. 18 shows a flexible tubular sleeve 72 that surrounds and fully contains the triggering portion 50, from the point of exit from the main body portion 12. The sleeve 72 is anchored, at an end 74 thereof, to the main body portion 12.

Referring to FIG. 19, the sleeve has a radially extending flange 76 at an opposite end 78 of the sleeve. The flange 76 has a hole 80 for passing the master linking member 16 therethrough, so that the end 16b is outside the sleeve. The end 16b is anchored to a handle member 82 of the triggering portion 50 that provides the dual functions of housing a spring-biased latch 84 and providing a user hand-grip.

The latch 84 is pivotally mounted to the handle member 82, and is spring-biased by, in this example, a torsion spring 81, though numerous alternatives are possible as will be readily appreciated. The latch 84 normally engages the flange 76 so as to lock, against the application of tensile force, the handle member to the cable housing. Thence, pulling on the former merely pulls on the latter rather than on the triggering portion 50, and the attachment point 10 will not accidentally be triggered to release the attachment point 5.

As a safety feature to guard against this possibility, the latching mechanism 84 must be consciously over-ridden by the user by depressing a spring-biased plunger 86, forcing the plunger against the bias against a lever portion of the latch 84 causing the latch 84 to pivot out of its locking position.

It will be appreciated that many alternative configurations of the actuating mechanism 70 are possible.

It will also be readily appreciated that, if the triggering portion 50 is adapted to trigger the CAR mechanism 13 by use of a compressive force, the latching mechanism 84 would be adapted to unlock in response to a tensile force, i.e., the principle is to provide for a force that opposes, directionally, the force that is used for triggering. So, as an example, if triggering is to result from user application of a compressive force to the linking member 16, the latching mechanism 84 would be adapted to pivot out of the position shown in FIG. 19 in response to being pulled. This and other similarly functioning adaptations will be readily apparent to persons of ordinary skill.

The master and slave tensile members are preferably twisted wire cables, and the master linking member 16 is preferably at least about a foot long, so that the end of the master linking member is within easy reach of the user when the user is wearing a harness attached to the attachment point 10.

The attachment point 10 is preferably provided to the user already connected to the attachment point 5, or other attachment point or attachment hardware, and the attachment point 10 is preferably replaced after it has undergone one release cycle. Thus, FIG. 10 shows the quick-release attachment point 10 in what is preferably considered to be a fully assembled condition. Alternatively, a quick-release attachment point like the attachment point 10 could be provided separately, but it would need to be modified so that the user could "set" it into the normal operating configuration after attaching the user's desired attachment point. The quick-release attachment point 10 described herein has no provision for the user to do this, and this is considered by the present inventors to provide yet another important safety feature.

It is to be understood that, while a specific quick-release attachment point for fall protection has been shown and described as preferred, other configurations could be utilized, in addition to those already mentioned, without departing from the principles of the invention. For example, as a substitute for the spring-bias applied to the sliding retainer, any source of energy may be utilized, such as an electric motor or a small explosive charge. Also, as a substitute for a cable operated remote control mechanism, which may itself take many alternative forms to those described herein, an electrically operated remote control module could be provided, either wired or wireless.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An apparatus for providing fall protection to a user, comprising:
   a capture and release module having a body supporting a capture and release mechanism, said body and said capture and release mechanism together defining a retaining aperture through said capture and release module for receiving an article of attachment hardware, said capture and release mechanism including a retaining member, said capture and release mechanism in a first configuration thereof being adapted to maintain said retaining member in a normal operating position of said retaining member in which said retaining member closes said retaining aperture, said capture and release mechanism in a second configuration thereof being no longer capable of maintaining said retaining member in said normal operating position, said capture and release module being adapted to permit said retaining member, in said second configuration, to move in a direction away from said normal operating position in an amount such that said retaining member no longer closes said retaining aperture; and
   a remote control module having a body separate from the body of said capture and release module, the remote control module for remotely causing a change in said capture and release mechanism from said first configuration into said second configuration in response to user manipulation of said remote control module, wherein said capture and release module further includes an energy source that is enabled by said change to move said retaining member in said direction at least said amount in response to said change.

2. The apparatus of claim 1, wherein the retaining aperture is maintained in a fixed position relative to the body.

3. The apparatus of claim 1, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

4. The apparatus of claim 3, wherein the retaining aperture is maintained in a fixed position relative to the body.

5. The apparatus of claim 1, adapted so that at least two distinct actions are required by the user for causing said change.

6. The apparatus of claim 5, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

7. The apparatus of claim 5, wherein the retaining aperture is maintained in a fixed position relative to the body.

8. The apparatus of claim 6, wherein the retaining aperture is maintained in a fixed position relative to the body.

9. The apparatus of claim 1, wherein said remote control module includes an elongate linking member linking said remote control module to said capture and release module, said elongate linking member having at least two separate portions, a first of the at least two separate portions which is permitted to move at least a predetermined amount relative to a second of the at least two separate portions before sufficient force can be transmitted from the first of the at least two separate portions to the second of the at least two separate portions to change said capture and release mechanism from said first configuration into said second configuration.

10. The apparatus of claim 9, adapted so that at least two distinct actions are required by the user for causing said change.

11. The apparatus of claim 10, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

12. The apparatus of claim 9, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

13. The apparatus of claim 9, wherein the retaining aperture is maintained in a fixed position relative to the body.

14. The apparatus of claim 1, wherein said source of energy is one or more springs adapted for first spring-biasing said retaining member relative to said body portion.

15. The apparatus of claim 14, wherein the retaining aperture is maintained in a fixed position relative to the body.

16. The apparatus of claim 14, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

17. The apparatus of claim 16, wherein the retaining aperture is maintained in a fixed position relative to the body.

18. The apparatus of claim 14, wherein said remote control module includes an elongate linking member linking said remote control module to said capture and release module, said elongate linking member having at least two separate portions, a first of the at least two separate portions which is permitted to move at least a predetermined amount relative to a second of the at least two separate portions before sufficient force can be transmitted from the first of the at least two separate portions to the second of the at least two separate portions to change said capture and release mechanism from said first configuration into said second configuration.

19. The apparatus of claim 18, adapted so that at least two distinct actions are required by the user for causing said change.

20. The apparatus of claim 19, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

21. The apparatus of claim 14, adapted so that at least two distinct actions are required by the user for causing said change.

22. The apparatus of claim 21, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

23. The apparatus of claim 22, wherein the retaining aperture is maintained in a fixed position relative to the body.

24. The apparatus of claim 21, wherein the retaining aperture is maintained in a fixed position relative to the body.

25. The apparatus of claim 18, further comprising a harness for the user to wear, the harness having one or more lengths of webbing, the capture and release module having at least one permanently closed harness-attachment aperture, wherein one or more of the one or more lengths of webbing pass through the at least one harness-attachment aperture.

* * * * *